United States Patent [19]

Berger et al.

[11] Patent Number: 5,656,321
[45] Date of Patent: Aug. 12, 1997

[54] ALMOND MILK PREPARATION PROCESS AND PRODUCTS OBTAINED

[76] Inventors: Jacques Berger; Guilaine Bravay; Martine Berger, all of Quartier de l'Infernet, Oraison 04700, France

[21] Appl. No.: 610,280

[22] Filed: Mar. 4, 1996

[51] Int. Cl.$^6$ ............................................. A23L 1/36
[52] U.S. Cl. .................................. 426/598; 426/632
[58] Field of Search ................... 426/632, 629, 426/598

[56] References Cited

U.S. PATENT DOCUMENTS

| | | | |
|---|---|---|---|
| 2,294,682 | 9/1942 | Moss, Jr. | 99/128 |
| 3,288,614 | 11/1966 | Miles | 426/598 |
| 4,025,658 | 5/1977 | Pominski | 426/598 |
| 4,064,277 | 12/1977 | Yokotsuka | 426/598 |
| 4,241,100 | 12/1980 | Wakana | 426/598 |
| 4,639,374 | 1/1987 | Matsunobu et al. | 426/43 |
| 5,086,166 | 2/1992 | Lawhon | 426/598 |

FOREIGN PATENT DOCUMENTS

| | | |
|---|---|---|
| 561351 | 10/1923 | France. |
| 1550401 | 12/1968 | France. |
| 2019262 | 11/1970 | Germany. |
| 1194299 | 6/1970 | United Kingdom ............ 426/598 |
| 2151449 | 7/1985 | United Kingdom ............ 426/598 |
| WO93/16608 | 9/1993 | WIPO. |

OTHER PUBLICATIONS

Nelson 1976 J Food Science 41(57).

*Primary Examiner*—Carolyn Paden
*Attorney, Agent, or Firm*—Greenblum & Bernstein, P.L.C.

[57] ABSTRACT

A process for preparing almond milk, as well as to products obtained thereby. The process of the invention includes heating, at 90° C., an aqueous dispersion of partially de-oiled almond powder, proportioned at 8%±1% and mixed with about 0.1% of a stabilizing hydrocolloid, for a lapse of time that is sufficient to allow the compounds to solubilize, then proceeding successively with a grinding in aqueous phase, a centrifugal clarification adapted to remove the particles that are large enough to be detected by the tongue or the roof of the mouth, a sterilization by "UHT" (ultra-high temperature) treatment, a homogenization at 180,000 hPa during cooling and, finally, with an aseptic packaging of the product obtained. The product of the invention can be used as a substitute for animal milk, and in particular cow's milk, to serve as a basis for creating a line of new products for human consumption, and making it possible to achieve an improved nutrition.

9 Claims, No Drawings

ALMOND MILK PREPARATION PROCESS AND PRODUCTS OBTAINED

CROSS-REFERENCE TO RELATED APPLICATION

The instant application is based upon International Application No. PCT/FR94/01011, filed on Aug. 17, 1994, the disclosure of which is hereby expressly incorporated by reference thereto in its entirety.

BACKGROUND OF THE INVENTION

1. Field of the Invention

The present invention relates to a process for preparing almond milk, as well as to by-products thereof.

Moreover, the invention is related to a product, made from a vegetable raw material, that can be used as a substitute for animal milk and, in particular, cow's milk, to serve as a basis for creating a line of new products intended for human diet, and make it possible to achieve a greatly improved nutrition.

2. Description of Background and Relevant Information

In the ordinary diet, nutriments such as milk, butter, yogurt, and sauces are all animal-derived. These nutriments, consumed daily in too large quantities, provide a surplus of fat in which the fatty acids are saturated. Therefore, they play a detrimental role in people who are prone to cardiovascular diseases.

Furthermore, some animal-derived food components are sometimes not well-carried by a more or less substantial fraction of consumers. For example, for the majority of consumers, cow's milk apparently does not pose any assimilation problem: it is a source of proteins and calcium. However, for other consumers, it is really not well tolerated. For the latter, cow's milk proteins can cause allergies, particularly in children.

Therefore, the production of new nutriments that are more easily digestible, cholesterol-free, with a high content of non-allergenic proteins and non-saturated fatty acids, presents a real nutritional interest and even becomes a necessity for a portion of the population.

U.S. Pat. No. 2,294,682, issued on Feb. 11, 1941, describes a process for manufacturing a vegetable butter from ground peanuts or similar leguminous plants, placed in aqueous solution and subjected to an enzymatic proteolysis at 27°54° C., and stopped at the end of the operation by destruction of the enzyme at 70°–110° C.

U.S. Pat. No. 4,639,374, issued on May 8, 1984, is related to a roasted almond paste intended for the preparation of beverages or desserts. It describes, in particular, the manufacturing process of an "acid almond milk" obtained by first passing the roasted almonds in a press at 200 kg/cm² to remove 50% of fat, by then mixing them with water, milk, sugar, a thickening agent and a surfactant, then passing the derived product in a mixer-homogenizer and in a homogenizer, before sterilizing it at 90° C., allowing it to ferment at 37°–40° C., and adding sugar thereto, the temperature being then raised to 75° C., the product being finally filtered and cooled.

The products featured in these patents have very limited applications, and their inventors do not in fact expect to use them as substitutes for animal milks.

International Application No. PCT/FR93/00201, filed by the Applicant of the present application, describes a process in which a very thin purée of fruits or shelled nuts is placed in an aqueous solution and subjected to a progressive temperature rise between 40° and 70° C. during which it undergoes a pressurized homogenization at 200,000–500,000 hPa, leading to a particle size distribution below 50 μm, then an enzymatic hydrolysis by bacterial proteases, amylases, glucanases specifically hydrolyzing the proteins or polysaccharide compounds, the temperature then being raised up to 110°–115° C. to stop the enzymatic reactions and ensure the bacteriological stability by pasteurization.

Unfortunately, the derived products, although conforming to the object sought, with respect to their composition, have proven to be insufficiently stable for an industrial production to be considered.

SUMMARY OF THE INVENTION

An object of the present invention is to propose a process that makes it possible to manufacture, from a predetermined vegetable raw material, a vegetable milk perfectly stable at ambient temperature, having a texture and an aspect that are close to those of the animal milk, capable of serving as a substitute therefor in the preparation of foods that can be consumed daily, and characterized by the absence of lactose, saturated fat, cholesterol and allergenic proteins.

The main interest of the invention lies in the production of new nutriments having a nutritional interest due to the particular composition of the raw materials used and to the process that enables the organoleptic quality to be improved.

These new nutriments are obtained from nuts selected for their high content of proteins, non-saturated fat, minerals, and possibly coming from biological farming.

The process of the invention comprises heating, at 90° C., an aqueous dispersion of partially de-oiled almond powder, proportioned at 8%±1% and mixed with about 0.1% of a stabilizing hydrocolloid, for a lapse of time that is sufficient to allow the compounds to solubilize, then proceeding successively with a grinding in aqueous phase, a centrifugal clarification adapted to remove the particles that are large enough to be detected by the tongue or the roof of the mouth, a sterilization by "UHT" (ultra-high temperature) treatment, a homogenization at 180,000 hPa during cooling and, finally, with an aseptic packaging of the product obtained.

DETAILED DESCRIPTION OF A PREFERRED EMBODIMENT

The following detailed description is related to a non-limiting example of embodiment of the object of the invention.

The vegetable raw material used in the invention is constituted of almonds that are shelled, blanched, non-roasted, partially de-oiled, preferably by cold pressing, and powdered.

Its composition will vary according to the following proportions:

| | |
|---|---|
| Humidity | 6% ± 2% |
| Starch | 12% ± 4% |
| Soluble sugar | 8% ± 4% |
| Total carbohydrates | 17% ± 3% |
| Protids | 53% ± 3% |
| Fibers | 6% ± 1% |
| Ashes | 6% ± 1% |

The process is characterized by the following successive steps.

The almond powder is first dry ground to obtain a product that is dispersed in cold water, at the rate of 8%±1% of flour by weight.

One adds 0.1%±0.05% of a stabilizing hydrocolloid to the mixture. The whole is then heated at 90° C. and brought to room temperature (maintaining of the temperature) during a lapse of time that is sufficient, typically 5 minutes, to obtain the solubilization of the food compounds, proteins, carbohydrates and minerals.

To increase the efficiency of the subsequent clarification step, a grinding in aqueous phase is then undertaken, preferably in a colloid mill.

The preparation, after being cooled at about 55° C. so as to cause an increase in the viscosity, is then subjected to a centrifugal clarification for about 2 minutes, at an acceleration a =38,000 m/s$^2$±3%, with the object of removing as completely as possible the particles that are large enough to be detected by the tongue or the roof of the mouth (particles greater than 50 μm).

The product is then sterilized at a high temperature that is maintained for the time necessary for obtaining the desired sterilizing value. During cooling, a pressurized homogenization at 180,000 hPa (180 bar) and, finally, an aseptic packaging of the product obtained are carried out.

The homogenization is performed in a homogenizer that produces a supplemental reduction of the particle size distribution. The passage in the homogenizer lasts a few seconds.

All of the operations described hereinabove could be carried out in a continuous manner, on a slag-type apparatus.

The operational parameters are set so as to obtain a controlled solubilization of the protein and polysaccharide fractions, a homogeneous and stable dispersion of the matter in suspension, as well as a control of the final viscosity of the product.

The biochemical composition of the final product must correspond to the following values:

| | |
|---|---|
| Protids | 3.6% ± 0.2% |
| Lipids | 0.9% ± 0.2% |
| Total carbohydrates | 0.5% ± 0.1% |
| Total dry matter | 5.5% ± 0.5% |

By way of example, the biochemical composition of the cow's milk is provided hereinafter:

| | |
|---|---|
| Protids | 3.08 to 3.70% |
| Lipids | 3.50 to 3.60% |
| Total carbohydates | 4.50% |

In spite of the difference in their compositions, the texture, aspect and color of the product according to the invention are close to those of the semi-skimmed cow's milk.

One of the novel characteristics of the invention is the fact that it applies to the limited field of nitrogenous nuts that are selected noble materials, of quality, and that the products obtained are intended for human nutrition.

The finality of the process is to obtain an element which enables, as cow's milk does, the production of varied products with great nutritional value.

These products are new and their development requires the invention of new recipes. Indeed, since the emphasis is placed on the nutritional aspect of the products, the addition of additives enabling their biological value to be perfected is to be taken into consideration. The biological value of the proteins is possibly optimized by the addition of bioassimilable aminoacids, thus eliminating the limiting factors. One can also add ingredients such as fruits, aromatic herbs, specific lipids or carbohydrates, protective substances, minerals, trace elements and vitamins, which are adjusted to the value desired for an ordinary or special nutrition. The products obtained can serve as partial substitutes for dairy produce and meat, for example in their organoleptic, digestive, physiological or usability (ready for use characteristic) functions.

The nature of the various constituent elements provides the object of the invention with a maximum of useful effects that have not, to date, been obtained by similar processes.

Although the invention has been described with reference to particular means, materials, and to a particular example, it is to be understood that the invention is not limited to the particulars expressly disclosed, but the invention extends to all equivalents within the scope of the claims that follow.

What is claimed is:

1. A process for preparing an almond milk for producing, from a vegetable raw material, a product that can be used as a substitute for animal milk, and in particular cow's milk, to serve as a basis for creating a line of new products for human consumption, and making it possible to achieve an improved nutrition, said process comprising the following steps:

dry grinding non-roasted almond powder;

dispersing the ground substance in cold water and adding a stabilizing hydrocolloid in the dispersed ground substance;

heating the dispersion at a temperature of approximately 90° C. and bringing to room temperature until solubilization of the food compounds (proteins, carbohydrates and minerals);

grinding the dispersion in aqueous phase to reduce the particle size distribution;

centrifugally clarifying the dispersion to remove particles that are large enough to be detected by the tongue or the roof of the mouth;

sterilizing by "UHT" treatment and cooling the product obtained;

homogenizing the product obtained under pressure; and aseptic packaging of said product.

2. A process according to claim 1, wherein:

the raw material is constituted of almonds that are shelled, blanched, non-roasted, partially de-oiled, preferably by cold pressing, and powdered, the composition of the powder being as follows:

| | |
|---|---|
| humidity | 6% ± 2% |
| starch | 12% ± 4% |
| soluble sugars | 8% ± 4% |
| total carbohydrates | 17% ± 3% |
| protids | 53% ± 3% |
| fibers | 6% ± 1% |
| ashes | 6% ± 1%. |

3. A process according to claim 1, wherein:

to create the aqueous dispersion, the almond powder is proportioned at 8%±1% by weight, and the stabilizing hydrocolloid at 0.1%±0.05%, also by weight.

4. A process according to claim 1, wherein:

the grinding in aqueous phase occurs in a colloid mill.

5. A process according to claim 1, wherein:

the centrifugal clarification is carried out at a temperature of approximately 55° C., for approximately two minutes, at an acceleration of 38,000 m/s$^2$+3%, and the parameters are set so as to remove as completely as possible the particles that are large enough to be detected by the tongue or the roof of the mouth.

6. A process according to claim 1, wherein:

the homogenization, after the clarification and sterilization, occurs under a pressure of approximately 180,000 hectoPascal, during cooling.

7. A process according to claim 1, wherein:

all of the operations are carried out by means of a slag-type material.

8. A vegetable milk made from almond powder by application of the process according to claim 1, adapted to be used as a substitute for animal milk, and in particular cow's milk, to serve as a basis for creating a line of products intended for human nutrition, wherein said vegetable milk has a biochemical composition corresponding to the following values:

| | |
|---|---|
| protids | 3.6% ± 0.2% |
| lipids | 0.9% ± 0.2% |
| total carbohydrates | 0.5% ± 0.1% |
| total dry matter | 5.5% ± 0.5%. |

9. A vegetable milk according to claim 8, wherein:

its aspect and color are close to those of the semi-skimmed cow's milk.

\* \* \* \* \*